United States Patent
Nemoto

(10) Patent No.: US 9,389,341 B2
(45) Date of Patent: Jul. 12, 2016

(54) METHOD OF MANUFACTURING LENS ARRAY PLATE, ERECTING EQUAL-MAGNIFICATION LENS ARRAY PLATE, AND OPTICAL SCANNING UNIT, AND IMAGE READING DEVICE

(75) Inventor: Hiroyuki Nemoto, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 179 days.

(21) Appl. No.: 13/527,823

(22) Filed: Jun. 20, 2012

(65) Prior Publication Data

US 2013/0003142 A1    Jan. 3, 2013

(30) Foreign Application Priority Data

Jun. 30, 2011 (JP) ................................. 2011-146645

(51) Int. Cl.
| | | |
|---|---|---|
| H04N 1/04 | (2006.01) | |
| G02B 3/00 | (2006.01) | |
| B29D 11/00 | (2006.01) | |
| H04N 1/03 | (2006.01) | |
| B29C 43/02 | (2006.01) | |

(52) U.S. Cl.
CPC ............ *G02B 3/0031* (2013.01); *B29C 43/021* (2013.01); *B29D 11/00298* (2013.01); *G02B 3/0062* (2013.01); *H04N 1/0306* (2013.01); *H04N 2201/02487* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,768,023 | A  * | 6/1998 | Sawaki et al. .................. | 359/622 |
| 6,545,811 | B1 * | 4/2003 | Fujimoto ....................... | 359/619 |
| 2007/0241469 | A1 * | 10/2007 | Nemoto ........... | B29D 11/00278 264/1.1 |
| 2010/0027129 | A1 * | 2/2010 | Sato et al. ...................... | 359/622 |
| 2013/0072615 | A1 * | 3/2013 | Muro ...................... | C08L 35/02 524/406 |

FOREIGN PATENT DOCUMENTS

| | | |
|---|---|---|
| JP | 57-008502 A | 1/1982 |
| JP | 60-17434 A | 1/1985 |
| JP | 2002-303703 A | 10/2002 |
| JP | 2005-022352 A | 1/2005 |
| JP | 2005-037884 A | 2/2005 |

OTHER PUBLICATIONS

Japanese Office Action for corresponding Application No. 2011-146645 issued Sep. 30, 2014.
Communication dated Mar. 24, 2015, issued by the Japanese Patent Office in counterpart Japanese application No. 2011-146645.
Communication dated Oct. 27, 2015, issued by the Japan Patent Office in corresponding Japanese Application No. 2011-146645.

* cited by examiner

*Primary Examiner* — Tammy Pham
*Assistant Examiner* — Idowu O Osifade
(74) *Attorney, Agent, or Firm* — Sughrue Mion, PLLC

(57) ABSTRACT

A method of manufacturing a lens array plate includes: forming a light shielding film on a flat surface of a dielectric substrate; forming a plurality of convex lenses on the flat surface of the dielectric substrate by press molding the dielectric substrate with the light shielding film; and forming a stack of two lens array plates manufactured by press molding. The light shielding film is not formed in a lens formation area in which the convex lens is formed.

13 Claims, 8 Drawing Sheets

SUB-SCANNING DIRECTION

METHOD OF MANUFACTURING LENS ARRAY PLATE, ERECTING EQUAL-MAGNIFICATION LENS ARRAY PLATE, AND OPTICAL SCANNING UNIT, AND IMAGE READING DEVICE

BACKGROUND OF THE INVENTION

1. Field of the Invention

The present invention relates to an erecting equal-magnification lens array plate used in image reading devices and image writing devices.

2. Description of the Related Art

Some image reading devices such as scanners are known to use erecting equal-magnification optics. Erecting equal-magnification optics are capable of reducing the size of devices better than reduction optics. In the case of image reading devices, an erecting equal-magnification optical system comprises a linear light source, an erecting equal-magnification lens array, and a linear image sensor.

In the related art, a rod lens array capable of forming an erect equal-magnification image is used as an erecting equal-magnification lens array in an erecting equal-magnification optical system. Recently, however, there is proposed an erecting equal-magnification lens array plate comprising a stack of two transparent lens array plates built such that the optical axes of individual convex lenses are aligned, where each transparent lens array plate includes a systematic arrangement of micro-convex lenses on both surfaces of the plate. Since an erecting equal-magnification lens array plate such as this comprises a stack of lens array plates that can be formed by, for example, injection molding, an erecting equal-magnification lens array can be manufactured at a relatively low cost.

An erecting equal-magnification lens array plate lacks a wall for beam isolation between adjacent lenses. Therefore, there is a problem in that a light beam diagonally incident on an erecting equal-magnification lens array plate travels diagonally inside the plate and enters an adjacent convex lens, creating noise (referred to as ghost noise) as it leaves the plate.

For example, patent document 1 discloses a lens array manufacturing method that addresses stray light, wherein a coarse surface part is formed between adjacent lenses, and the coarse surface part is imparted with the function of preventing transmission of light across adjacent lenses by coating the coarse surface part with a light shielding paint.

[patent document 1] JP2002-303703

However, since the manufacturing method disclosed in patent document 1 requires forming a coarse surface part between adjacent lenses, coating the coarse surface part with a light shielding paint, etc., the method involves quite complex processes. In particular, individual lenses used in a lens array are quite small and quite numerous. Therefore, it is not easy to coat only an area between adjacent lenses with a light shielding paint by masking the lenses. Therefore, the manufacturing cost tends to be high in the case of the manufacturing method disclosed in patent document 1.

SUMMARY OF THE INVENTION

The present invention addresses the aforementioned disadvantage and a purpose thereof is to provide a method of manufacturing a lens array plate and an erecting equal-magnification lens array plate capable of reducing the manufacturing cost.

To address the aforementioned problem, the method of manufacturing a lens array plate according to one embodiment of the present invention comprises: forming a light shielding film on a flat surface of a substrate; and forming a plurality of lenses on the flat surface of the substrate by press molding the substrate with the light shielding film.

The light shielding film may not be formed in a lens formation area in which a lens is formed.

The forming of lenses by press molding may comprise: forming the lenses by pressing the lens formation area; and forming a light shielding wall surrounding the lens by pressing an area around the lens formation area formed with the light shielding film.

The forming of the lenses and the forming of the light shielding wall may be performed at the same time.

Another embodiment of the present invention relates to a method of manufacturing an erecting equal-magnification lens array plate. The method comprises forming a stack of a plurality of lens array plates manufactured according to the method described above.

Still another embodiment of the present invention relates to an optical scanning unit comprising: a linear light source configured to illuminate a document to be read; the erecting equal-magnification lens array plate manufactured by the above-described method configured to condense light reflected by the document to be read; and a linear image sensor configured to receive light transmitted by the erecting equal-magnification lens array plate.

Yet another embodiment of the present invention relates to an image reading device comprising: the above-described optical scanning unit; and an image processing unit configured to process an image signal detected by the optical scanning unit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A description will be given of a method of manufacturing a lens array plate and an erecting equal-magnification lens array plate according to an embodiment of the present invention. A description will also be given of an erecting equal-magnification lens array plate manufactured by the inventive manufacturing method.

Figure 1:
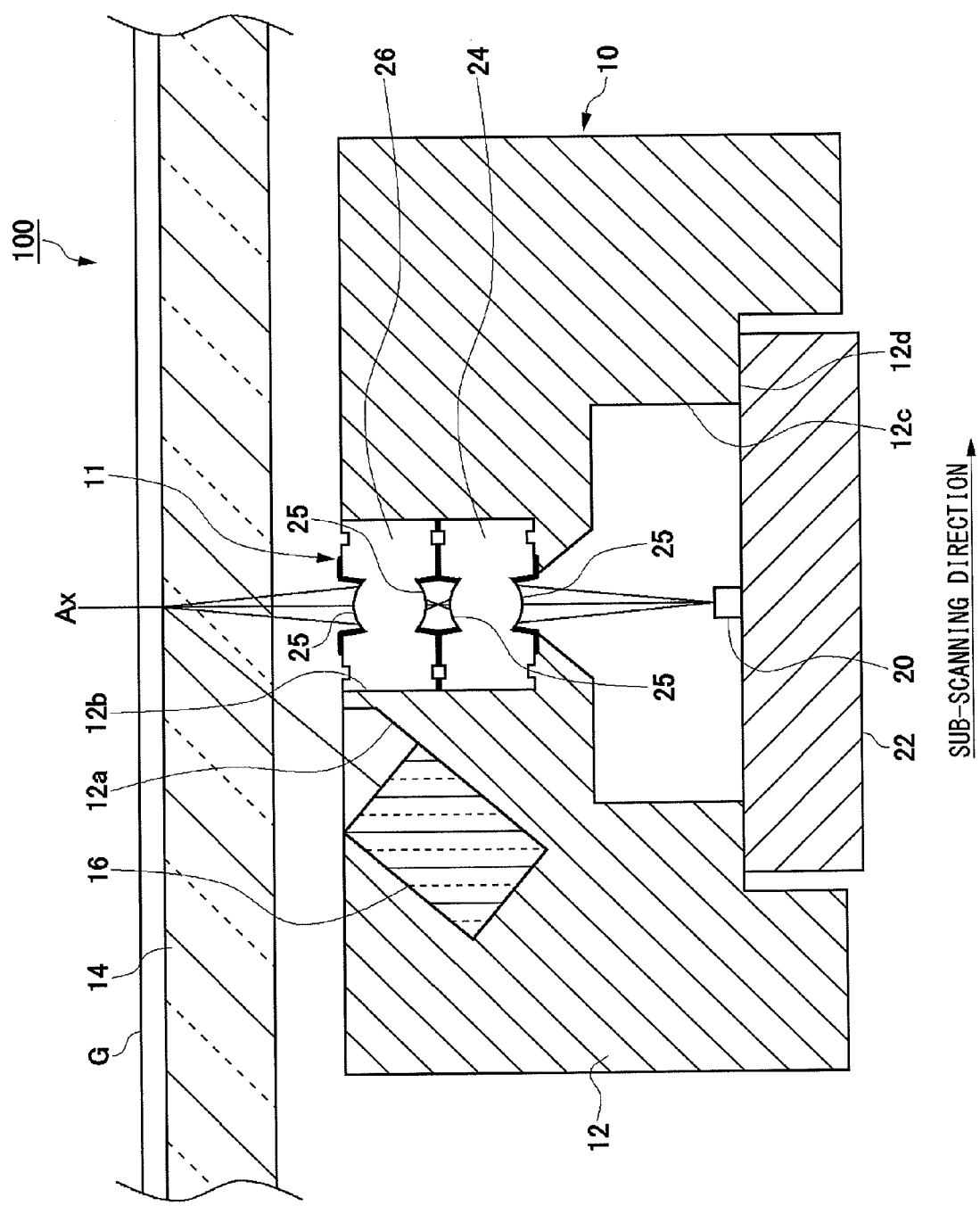
FIG. 1 shows an image reading device in which an erecting equal-magnification lens array plate is used.

FIG. 1 shows an image reading device in which an erecting equal-magnification lens array plate is used. As shown in FIG. 1, the image reading device 100 comprises an optical scanning unit 10, a glass plate 14 on which a document G is placed, a driving mechanism (not shown) for driving the optical scanning unit 10, and an image processing unit (not shown) for processing data read by the optical scanning unit 10.

The optical scanning unit 10 comprises a linear light source 16 for illuminating a document G placed on the glass plate 14, an erecting equal-magnification lens array plate 11 for condensing light reflected from the document G, a linear image sensor (photoelectric transducer) 20 for receiving light condensed by the erecting equal-magnification lens array plate 11, and a housing 12 for housing the linear light source 16, the erecting equal-magnification lens array plate 11, and the linear image sensor 20.

The housing 12 is substantially rectangular solid in shape. A first recess 12a and a second recess 12b are formed in the upper part of the housing 12 and a third recess 12c is formed in the lower part. The housing 12 is formed by injection-molding a resin. By forming the housing 12 by injection molding, the housing 12 can be formed easily at a low cost. The linear light source 16 is diagonally fixed inside the first recess 12a. The linear light source 16 is secured such that the optical axis of the illuminating light passes through the intersection of the optical axis Ax of the erecting equal-magnification lens array plate 11 and the top surface of the glass plate 14.

The erecting equal-magnification lens array plate 11 is fitted in the second recess 12b. A substrate 22 provided with the linear image sensor 20 is fitted in the third recess 12c. The substrate 22 is secured such that the top surface thereof is in contact with a step 12d provided in the third recess 12c.

The erecting equal-magnification lens array plate 11 comprises a stack of a first lens array plate 24 and a second lens array plate 26 built such that pairs of corresponding lenses form a coaxial lens system, where each lens array plate is formed with a plurality of convex lenses 25 on both surfaces of the plate.

Preferably, each of the first lens array plate 24 and the second lens array plate 26 is formed of a material that can be used in press molding, having high light transmittance in a desired wavelength range, and having low water absorption. Desired materials include a dielectric material such as cycloolefin resins, olefin resins, norbornene resins, acrylic resin, and polycarbonate.

The erecting equal-magnification lens array plate 11 is installed in the image reading device 100 such that the longitudinal direction thereof is aligned with the main scanning direction and the lateral direction thereof is aligned with the sub-scanning direction. The erecting equal-magnification lens array plate 11 is configured to receive linear light reflected from the document G located above and form an erect equal-magnification image on an image plane located below, i.e., a light-receiving surface of the linear image sensor 20. The image reading device 100 can read the document G by scanning document G with the optical scanning unit 10 in the sub-scanning direction.

Figure 2:
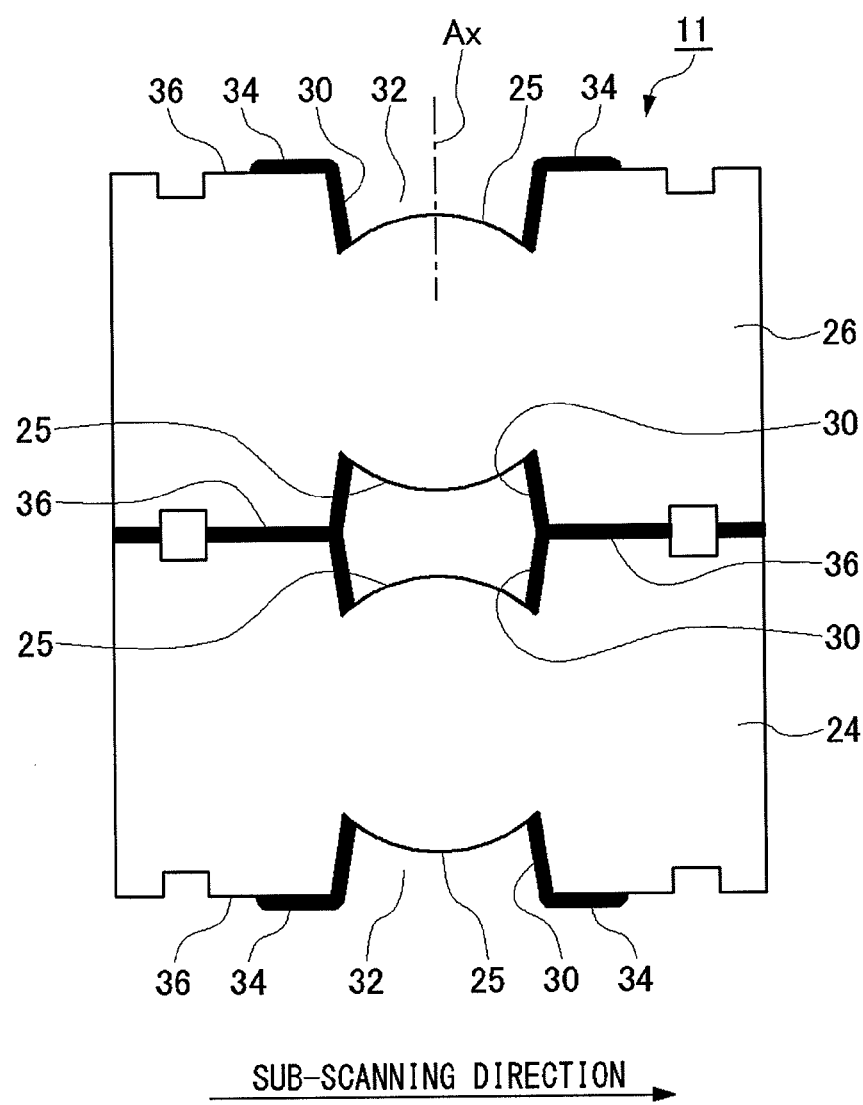
FIG. 2 shows the structure of an erecting equal-magnification lens array plate.

FIG. 2 shows the structure of an erecting equal-magnification lens array plate 11. As described above, the erecting equal-magnification lens array plate 11 comprises a stack of the first lens array plate 24 and the second lens array plate 26, where each lens array plate is formed with a plurality of convex lenses 25 on both surfaces of the plate. A plurality of convex lenses 25 are arranged in a single line on each surface 36 of the erecting equal-magnification lens array plate 11 in the longitudinal direction (main scanning direction) of the lens array plate.

As shown in FIG. 2, a light shielding wall 30 is provided around each convex lens 25. The light shielding wall 30 is formed substantially parallel with an optical axis Ax of each convex lens 25 so as to surround each convex lens 25.

In other words, it can be said that each surface 36 of the erecting equal-magnification lens array plate 11 is formed with a plurality of recesses 32, and the convex lens 25 is provided in each of the recesses 32. In this case, the light shielding wall 30 represents the interior wall of the recess 32.

Further, a light shielding film 34 is formed around the convex lens 25 on each surface 36 of the erecting equal-magnification lens array plate 11. As shown in FIG. 2, the light shielding wall 30 and the light shielding film 34 are formed to be continuous with each other. The light shielding wall 30 and the light shielding film 34 have the function of shielding stray light that does not contribute to imaging.

A description will now be given of the method of manufacturing the erecting equal-magnification lens array plate 11. To describe the manufacturing method briefly, lens array plates are first manufactured. Then, two lens array plates are stacked to manufacture an erecting equal-magnification lens array plate.

Figure 3A:
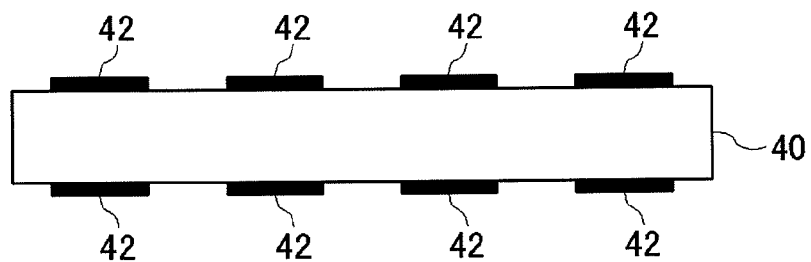
FIGS. 3A and 3B show the first step of the method of manufacturing an erecting equal-magnification lens array plate.
Figure 3B:
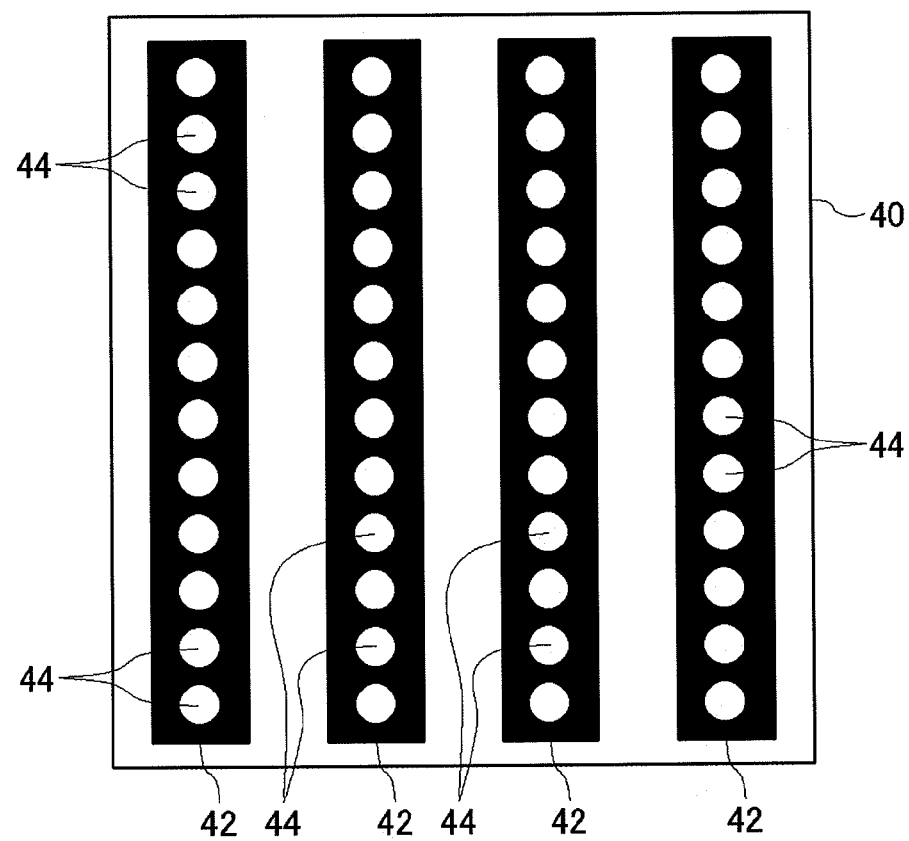

FIGS. 3A and 3B show the first step of the method of manufacturing an erecting equal-magnification lens array plate. FIG. 3A is a sectional view and FIG. 3B is a top view. As shown in FIGS. 3A and 3B, a light shielding film 42 is formed on both flat surfaces of a flat dielectric substrate 40 in the first step. The material of the dielectric substrate 40 may be cycloolefin resins, olefin resins, norbornene resins, acrylic resin, polycarbonate, etc. The material of the light shielding film 42 may be ultraviolet cure dark ink. In this case, it is favorable that the surface is satin finished after being dried. FIGS. 3A and 3B show four bands of light shielding films 42 on the flat surfaces opposite to each other. This is to manufacture four erecting equal-magnification lens array plates 11 at the same time.

As shown in FIG. 3B, an area 44 in the band of light shielding film 42 (referred to as "lens formation area 44") in which a convex lens is formed in the press process described later is not formed with the light shielding film 42. The lens formation area 44 is a circular area.

Figure 4:
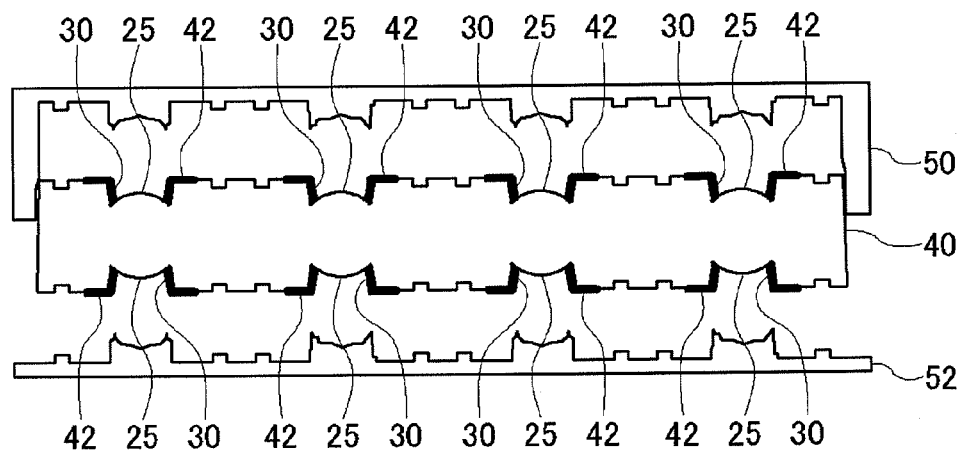
FIG. 4 shows the second step of the method of manufacturing an erecting equal-magnification lens array plate.

FIG. 4 shows the second step of the method of manufacturing an erecting equal-magnification lens array plate. In the second step, the dielectric substrate 40 with the light shielding film is heated and softened. The dielectric substrate 40 is then press molded using an upper mold 50 and a lower mold 52 so as to form the convex lens 25 in the lens formation area.

In this embodiment, concurrently with forming the convex lens 25 by pressing the lens formation area, the area around the lens formation area formed with the light shielding film 42 is pressed so as to be bent and extended, thereby forming the light shielding wall 30 around the convex lens 25.

As a result of the steps as described above, an assembly of four lens array plates joined together (hereinafter, referred to as "lens array plate group") is formed.

Figure 5A:
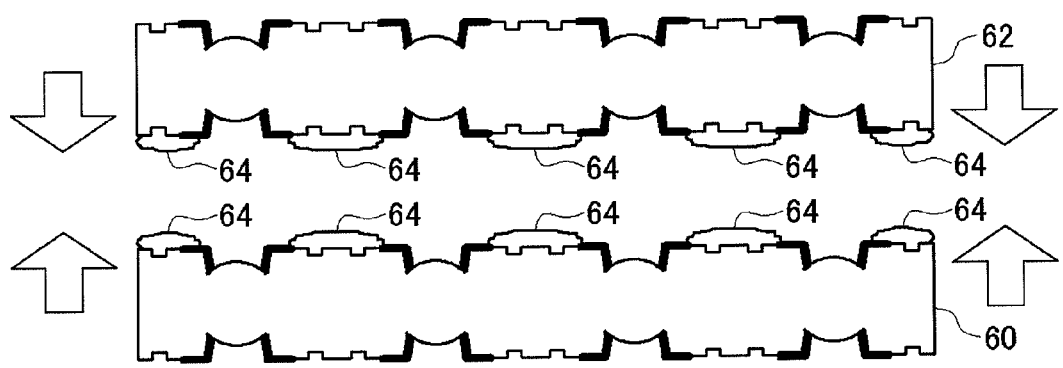
FIGS. 5A and 5B show the third step of the method of manufacturing an erecting equal-magnification lens array plate.
Figure 5B:
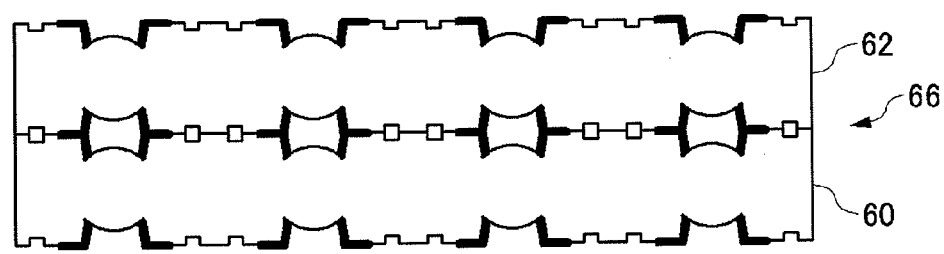

FIGS. 5A and 5B show the third step of the method of manufacturing an erecting equal-magnification lens array plate. As shown in FIG. 5A, an adhesive 64 is applied to a predetermined position in two lens array plate groups 60 and 62 so as to form an adhesively bonded stack of the lens array plate groups 60 and 62. As shown in FIG. 5B, this forms an assembly of four erecting equal-magnification lens array plates joined together (hereinafter, referred to as "erecting equal-magnification lens array plate group 66").

Figure 6A:
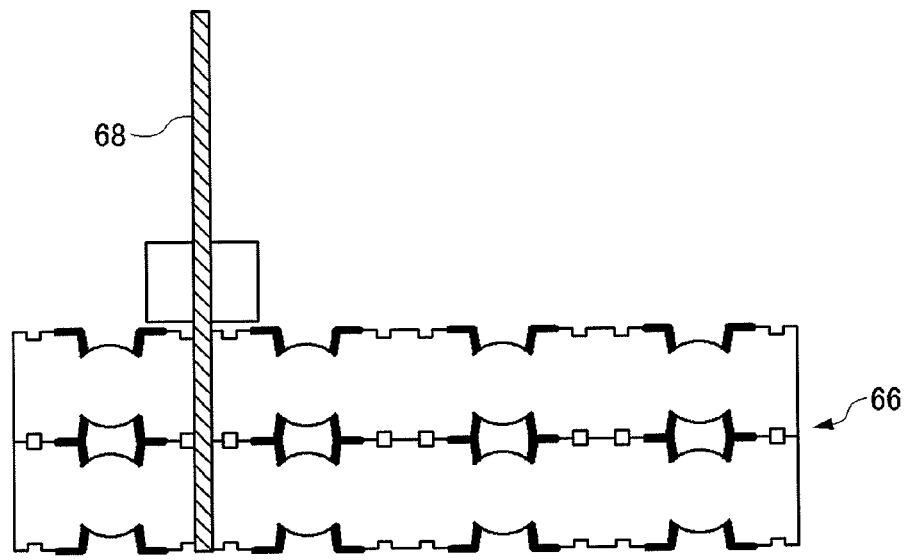
FIGS. 6A and 6B show the fourth step of the method of manufacturing an erecting equal-magnification lens array plate.
Figure 6B:
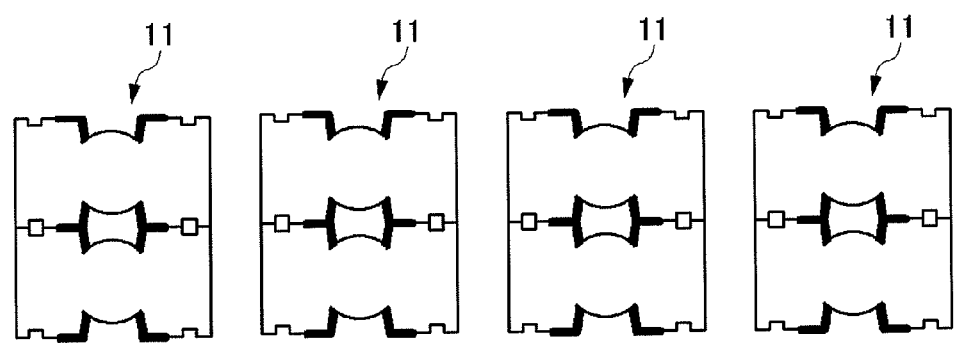

FIGS. 6A and 6B show the fourth step of the method of manufacturing an erecting equal-magnification lens array plate. As shown in FIG. 6A, the erecting equal-magnification lens array plate group 66 is cut by a cutting blade 68. This produces four erecting equal-magnification lens array plates 11 as shown in FIG. 6B.

As described above, according to the method of manufacturing an erecting equal-magnification lens array plate of the embodiment, the light shielding film and the light shielding wall are already formed when the lens is press molded. Since this eliminates the need for steps of forming a light shielding film or a light shielding wall by masking the convex lens, the manufacturing cost is reduced. In further accordance with the embodiment, the lens surface is prevented from being damaged when a light shielding film or a light shielding wall is formed.

Moreover, since the convex lenses are press molded on both surfaces of the dielectric substrate, the optical axes of the convex lenses on both surfaces can be aligned. By forming convex lenses on both surfaces, the surface areas of the surfaces approximate each other. This prevents deformation from occurring when the plate is cooled or released from the mold.

By stacking lens array plates manufactured in the same step as in the embodiment, the plates will exhibit the same degree of deformation or lens position precision. Therefore, it is ensured that the optical axes of the individual convex lenses are aligned. This ensures uniform imaging characteristics on the plane.

Figure 7A:
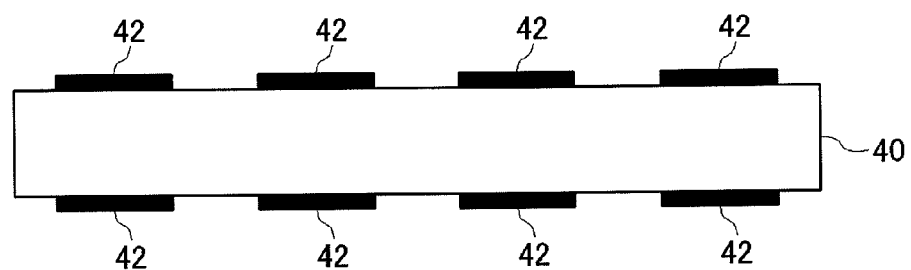
FIGS. 7A and 7B show an alternative method of manufacturing an erecting equal-magnification lens array plate.
Figure 7B:
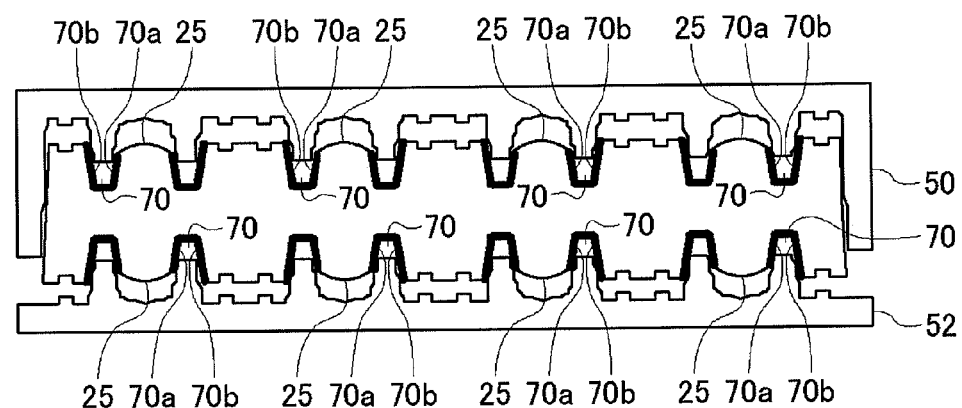

FIGS. 7A and 7B show an alternative method of manufacturing an erecting equal-magnification lens array plate. The shape of the light shielding wall formed by the press process according to this method differs from that of the aforementioned method.

First, as shown in FIG. 7A, the light shielding film 42 is formed on both flat surfaces of the flat dielectric substrate 40. In this embodiment, as in the foregoing embodiment, four bands of light shielding films 42 are formed on the flat surfaces opposite to each other in order to manufacture four erecting equal-magnification lens array plates at the same time.

Next, as shown in FIG. 7B, the convex lens 25 is formed in the lens formation area by heating and softening the dielectric substrate 40 with the light shielding film, and then press molding the dielectric substrate 40 using the upper mold 50 and the lower mold 52.

In this embodiment, a recess 70 is press molded around the convex lens 25 concurrently with press molding the convex lens 25. Since the recess 70 is formed by bending and extending the area around the lens formation area formed with the light shielding film 42, the interior wall of the recess 70 is covered by the light shielding film. In other words, the interior wall surface adjacent to the convex lens 25 is formed with an inner light shielding wall 70*a*, and the interior wall surface away from the convex lens 25 is formed with an outer light shielding wall 70*b*. The inner light shielding wall 70*a* and the outer light shielding wall 70*b* are substantially parallel with the optical axis of the convex lens 25.

Four erecting equal-magnification lens array plates 11 are obtained by forming an adhesively bonded stack of the two lens array plate groups formed as described above and cutting the plates. In this way, light shielding walls of various forms can be formed by press molding. The manufacturing method according to this embodiment also provides the same advantage as already described above.

FIG. 8A-8E show an alternative method of manufacturing an erecting equal-magnification lens array plate. In this manufacturing method, convex lenses are formed only on one of the flat surfaces of the dielectric substrate.

Figure 8A:
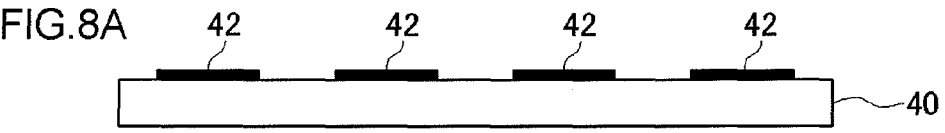
FIG. 8A-8E show an alternative method of manufacturing an erecting equal-magnification lens array plate.

First, as shown in FIG. 8A, the light shielding film 42 is formed on one of the flat surfaces of the dielectric substrate 40. In this embodiment, as in the foregoing embodiments, four bands of light shielding films 42 are formed in order to manufacture four erecting equal-magnification lens array plates at the same time.

Figure 8B:
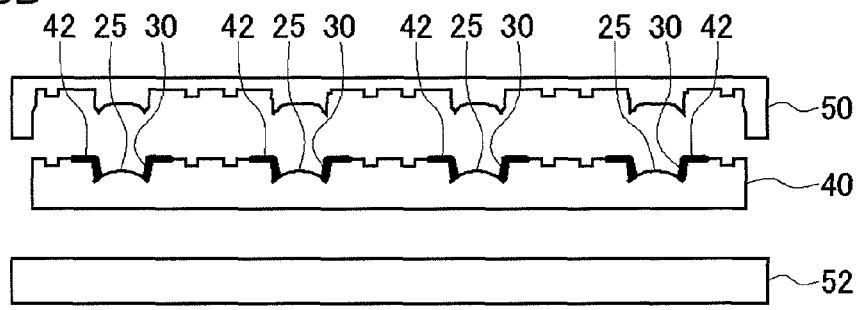

Next, as shown in FIG. 8B, the convex lens 25 is formed only on one of the flat surfaces of the dielectric substrate 40 by heating and softening the dielectric substrate 40 with the light shielding film, and then press molding the dielectric substrate 40 using the upper mold 50 and the lower mold 52. Concurrently with forming the convex lens 25, the area around the lens formation area formed with the light shielding film 42 is pressed so as to be bent and extended, thereby forming the light shielding wall 30 around the convex lens 25. An assembly in which convex lenses are formed only on one surface will be referred to as a "half lens array plate group".

Figure 8C:
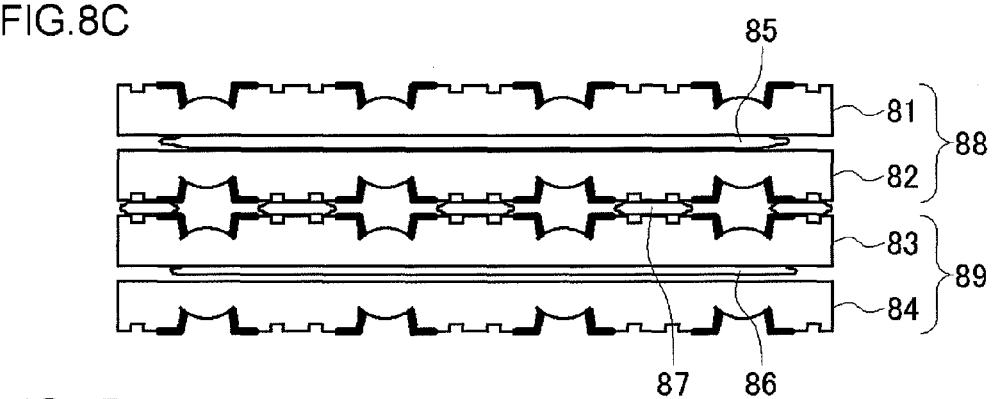

Next, as shown in FIG. 8C, an adhesively bonded stack of four half lens array plate groups 81-84 is formed. More specifically, the flat surface of the first half lens array plate group 81 in which convex lenses are not formed and the flat surface of the second half lens array plate group 82 in which convex lenses are not formed are bonded by an adhesive 85, thereby forming a first lens array plate group 88. Further, the flat surface of the third half lens array plate group 83 in which convex lenses are not formed and the flat surface of the fourth half lens array plate group 84 in which convex lenses are not formed are bonded by an adhesive 86, thereby forming a second lens array plate group 89. Then, an adhesively bonded stack comprising the first lens array plate group 88 and the second lens array plate group 89 is formed using an adhesive 87, thereby producing an erecting equal-magnification lens array plate group.

Figure 8D:
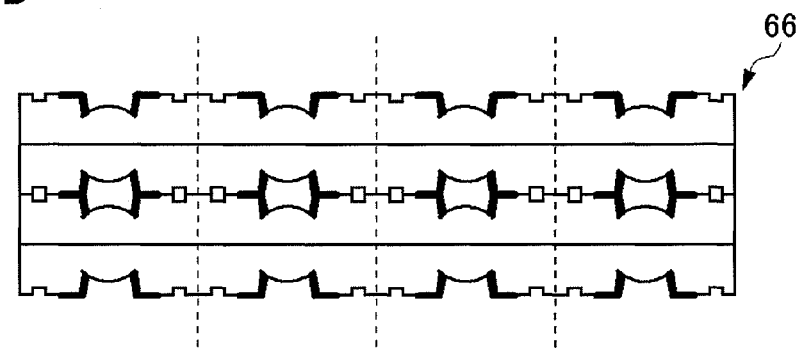
Figure 8E:
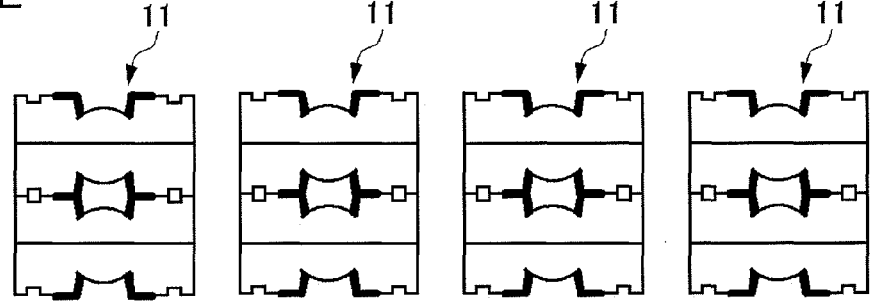

Next, as shown in FIG. 8D, the erecting equal-magnification lens array plate group 66 is cut by a cutting blade. This produces four erecting equal-magnification lens array plates 11 as shown in FIG. 8E.

By forming convex lenses only on one of the flat surfaces of the dielectric substrate as in this embodiment, it is easy to remove the substrate from the mold. In this case, the direction of warp due to heat contraction of the dielectric substrate will be convex with respect to the flat surface side not formed with convex lenses so that uniform plate thickness results when the flat surfaces are bonded.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiments described above, the light shielding film and the light shielding wall are formed around the convex lens. Alternatively, only the light shielding film may be formed. Still alternatively, when two lens array plates are stacked such that the neighborhood of the convex lens in one of the plates is in contact with the corresponding area in the other plate, one of the lens array plates may not be provided with the light shielding film.

The height of the light shielding wall may be changed to suit the optical design. The pitch of convex lenses or light shielding walls may differ between the surfaces of the lens array plate.

In the embodiments described above, the optical axes of the four convex lenses are aligned. Alternatively, imaging optics may be formed such that the optical axes of three convex lenses are aligned, by using the lens array plate described with reference to FIGS. 8A-8E.

What is claimed is:

1. A method of manufacturing a lens array plate comprising:
    preparing a dielectric substrate having parallel flat surfaces;
    forming a light shielding film on a flat surface of a substrate; and
    forming a plurality of lenses in the substrate by press molding the flat surface of the substrate with the light shielding film, the plurality of lenses being recessed in the substrate,
    wherein the light shielding film is not formed in a lens formation area in which a lens is formed,
    wherein the forming of lenses by press molding comprises:
    press molding an area formed around the lens formation area and formed with the light shielding film, thereby forming a recess having a substantially columnar profile that extends from the surface of the substrate toward the interior thereof, the substantially columnar profile being comprised of an interior sidewall surface and a bottom interior surface, wherein the sidewall surface of the recess is provided with the light shielding film bent and extended by the press molding; and
    forming the lens on the bottom interior surface of the recess by press molding the lens formation area of the substrate.

2. The method of manufacturing a lens array plate according to claim 1,
    wherein the forming of the recess and the forming of the lens on the bottom interior surface of the recess are performed at the same time.

3. A method of manufacturing an erecting equal-magnification lens array plate comprising:
    forming a stack of a plurality of lens array plates manufactured according to the method of claim 1.

4. The method of manufacturing a lens array plate according to claim 1, wherein
    the light shielding film formed on the flat surface of the substrate is formed as a band except in the lens formation area,
    a plurality of lens formation areas having a substantially circular profile are aligned in the longitudinal direction of the band of light shielding film.

5. The method of manufacturing a lens array plate according to claim 2, wherein
    portions of a press mold for forming the lens and the recess are formed on the same surface.

6. The method of manufacturing a lens array plate according to claim 1,
    wherein the press molding results in the light shielding film covering the side of the recess to the lens.

7. The method of manufacturing a lens array plate according to claim 1,
    wherein the plurality of lenses and recesses are formed on the flat surface and an opposed flat surface of the substrate, the surface areas of the flat surface and the opposed flat surface being substantially identical,
    wherein lenses formed on the flat surface and the opposed flat surface are coaxial, and
    wherein the lenses and the recesses on the respective surfaces of the substrate are substantially identical.

8. An optical scanning unit comprising:
    a linear light source configured to illuminate a document to be read;
    an erecting equal-magnification lens array plate configured to condense light reflected by the document to be read, comprising:
    a light shielding film formed on a flat surface of a substrate;
    a plurality of lenses of the substrate formed by press molding the flat surface of the substrate with the light shielding film, the press molding comprising forming the lenses by pressing a lens formation area, the plurality of lenses being recessed in the substrate;
    wherein the light shielding film is not formed in a lens formation area in which a lens is formed,
    wherein the forming of lenses comprises:
    press molding an area formed around the lens formation area and formed with the light shielding film, thereby forming a recess having a substantially columnar profile that extends from the surface of the substrate toward the interior thereof, the substantially columnar profile being comprised of an interior sidewall surface and a bottom interior surface, wherein the sidewall surface of the recess is provided with the light shielding film bent and extended by the press molding; and
    forming the lens on the bottom interior surface of the recess by press molding the lens formation area of the substrate,
    wherein a stack of a plurality of lens array plates is formed; and
    a linear image sensor configured to receive light transmitted by the erecting equal-magnification lens array plate.

9. An image reading device comprising:
    the optical scanning unit according to claim 6; and
    an image processing unit configured to process an image signal detected by the optical scanning unit.

10. A method of manufacturing a lens array plate comprising:
    preparing a dielectric substrate having parallel flat surfaces;
    forming, subsequent to the preparing the dielectric substrate, a light shielding film on a flat surface of the substrate; and
    forming, subsequent to the forming the light shielding film, a lens in the substrate by press molding the flat surface of substrate,
    wherein the light shielding film is not formed in a lens formation area in which a lens is formed,
    wherein the forming of the lens comprises:
    press molding an area formed around the lens formation area and formed with the light shielding film, thereby forming a recess having a substantially columnar profile that extends from the surface of the substrate toward the interior thereof, the substantially columnar profile being comprised of an interior sidewall surface and a bottom interior surface, wherein the sidewall surface of the recess is provided with the light shielding film bent and extended by the press molding; and
    forming the lens on the bottom interior surface of the recess by press molding the lens formation area of the substrate, and
    wherein portions of a press mold for forming the lens and the recess are formed on the same surface.

11. The method of manufacturing a lens array plate according to claim 10, wherein
    the light shielding film formed on the flat surface of the substrate is formed as a band except in the lens formation area, a plurality of lens formation areas having a substantially circular profile are aligned in the longitudinal direction of the band of light shielding film.

12. A method of manufacturing an erecting equal-magnification lens array plate, comprising:

forming a stack of a plurality of lens array plates manufactured according to the method of claim 11.

13. The method of manufacturing an erecting equal-magnification lens array plate according to claim 12, wherein the light shielding film formed on the flat surface of the substrate is formed as a band except in the lens formation area, a plurality of lens formation areas having a substantially circular profile are aligned in the longitudinal direction of the band of light shielding film, and the method further comprises:

cutting, subsequent to the forming of a stack of a plurality of lens array plates, the substrate along the longitudinal direction of the band of light shielding film.

\* \* \* \* \*